United States Patent
Hsu et al.

(10) Patent No.: US 9,715,083 B2
(45) Date of Patent: Jul. 25, 2017

(54) OPTICAL IMAGING LENS AND ELECTRONIC DEVICE COMPRISING THE SAME

(71) Applicants: Sheng-Wei Hsu, Taichung (TW); Chih-Yang Yeh, Taichung (TW)

(72) Inventors: Sheng-Wei Hsu, Taichung (TW); Chih-Yang Yeh, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 71 days.

(21) Appl. No.: 14/585,209

(22) Filed: Dec. 30, 2014

(65) Prior Publication Data

US 2016/0116713 A1    Apr. 28, 2016

(30) Foreign Application Priority Data

Oct. 28, 2014  (TW) .................................. 103137265

(51) Int. Cl.
| | | |
|---|---|---|
| *G02B 13/18* | (2006.01) | |
| *G02B 9/12* | (2006.01) | |
| *G02B 13/00* | (2006.01) | |

(52) U.S. Cl.
CPC ........... *G02B 13/0035* (2013.01); *G02B 9/12* (2013.01); *G02B 13/0015* (2013.01)

(58) Field of Classification Search
CPC . G02B 9/00; G02B 9/12; G02B 13/00; G02B 13/001; G02B 13/0015; G02B 13/002; G02B 13/0035; G02B 13/008
See application file for complete search history.

(56) References Cited

U.S. PATENT DOCUMENTS

| | | | | |
|---|---|---|---|---|
| 6,987,625 B2* | 1/2006 | Nakamura | ............... | G02B 9/12 359/716 |
| 7,167,323 B2* | 1/2007 | Isono | ...................... | G02B 9/04 359/716 |
| 7,184,225 B1* | 2/2007 | Noda | ..................... | G02B 13/18 359/738 |
| 7,436,605 B2 | 10/2008 | Asami | | |
| 7,813,056 B2 | 10/2010 | Asami | | |
| 8,331,036 B2* | 12/2012 | Tang | .................. | G02B 13/0035 359/716 |

(Continued)

FOREIGN PATENT DOCUMENTS

| | | |
|---|---|---|
| JP | 4720214 | 7/2011 |
| TW | 201115180 | 5/2011 |

(Continued)

*Primary Examiner* — Thong Nguyen
(74) *Attorney, Agent, or Firm* — Winston Hsu

(57) ABSTRACT

An optical imaging lens includes: a first, second and third lens element. The first lens element has a positive refracting power, and has an object-side surface with a convex part in a vicinity of the optical axis, and a convex part in a vicinity of its periphery. The second lens element has a positive refracting power, and has an object-side surface with a concave part in a vicinity of the optical axis, and a concave part in a vicinity of its periphery, and has an image-side surface with a convex part in a vicinity of the optical axis. The third lens element has negative refracting power, and has an image-side surface with a concave part in a vicinity of the optical axis, and a convex part in a vicinity of its periphery.

14 Claims, 20 Drawing Sheets

(56) References Cited

U.S. PATENT DOCUMENTS

| | | | | |
|---|---|---|---|---|
| 8,792,184 B2 * | 7/2014 | Matsui | ............... | G02B 13/0035 |
| | | | | 359/689 |
| 2005/0264671 A1 * | 12/2005 | Isono | ....................... | G02B 9/12 |
| | | | | 348/335 |
| 2015/0029602 A1 * | 1/2015 | Kubota | .............. | G02B 13/0035 |
| | | | | 359/791 |

FOREIGN PATENT DOCUMENTS

| TW | 201227039 | 7/2012 |
|---|---|---|
| TW | 201317656 | 5/2013 |

* cited by examiner

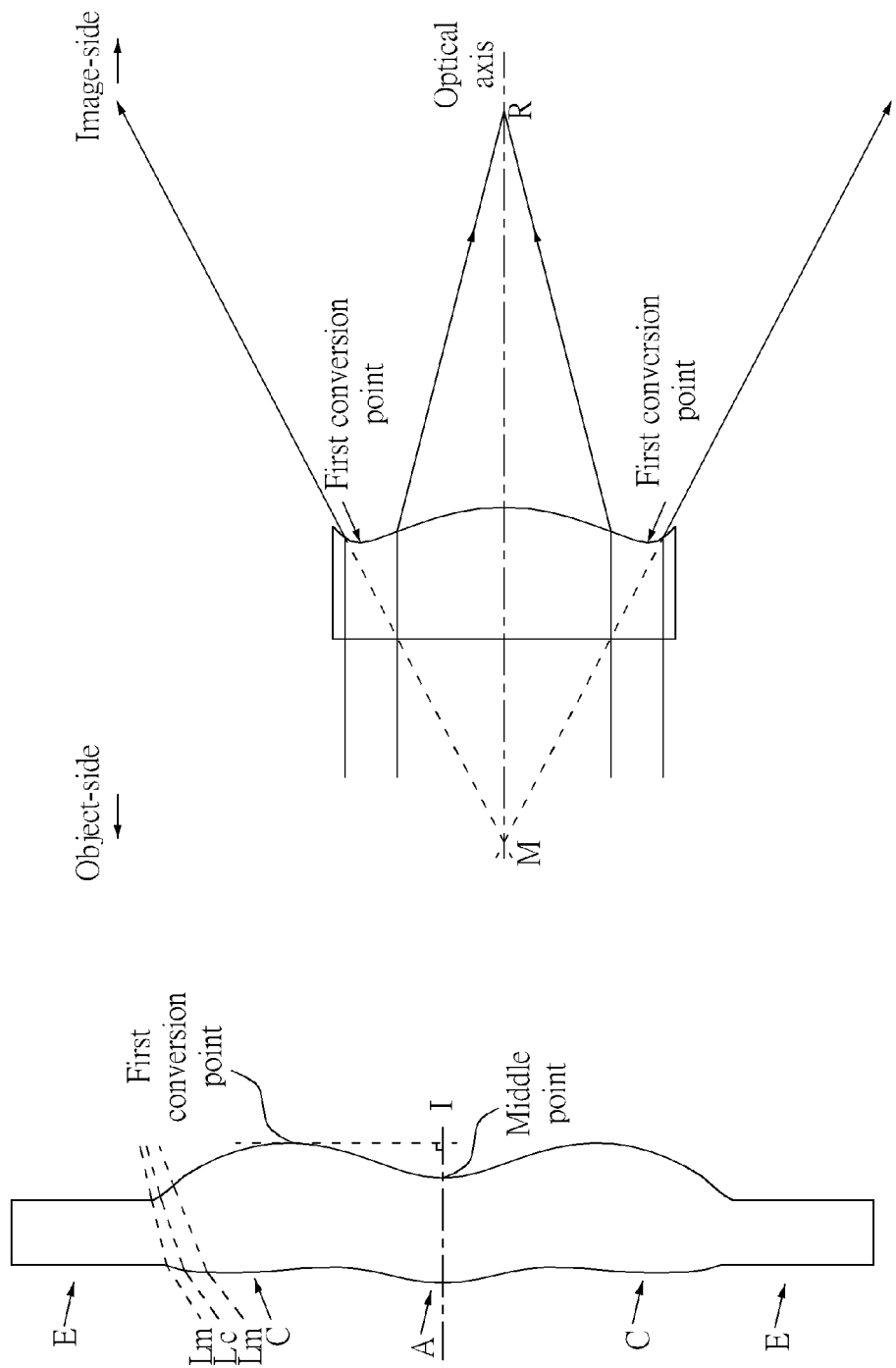

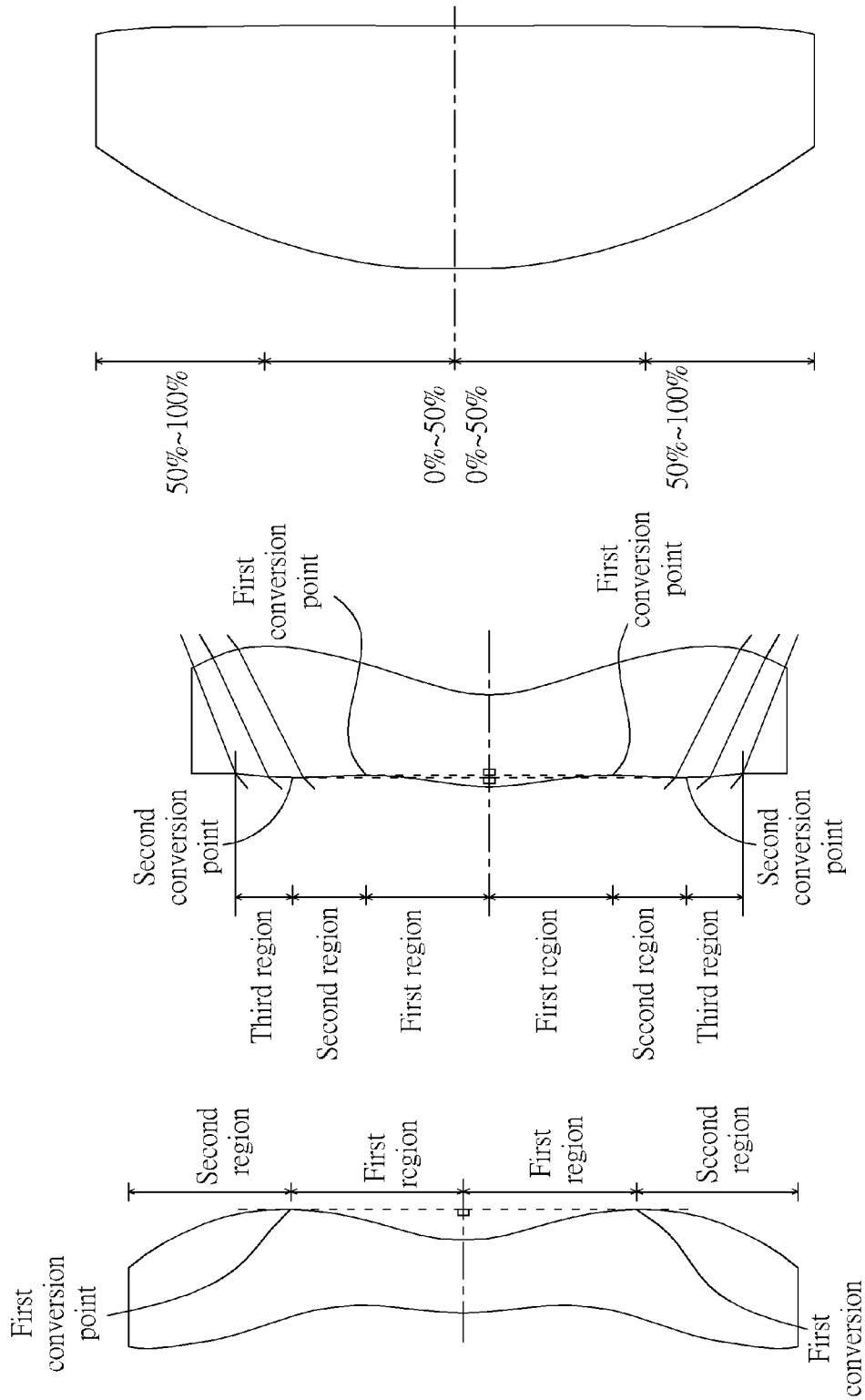

| First Example | | | | | |
|---|---|---|---|---|---|
| EFL(Effective Focal Length)= 1.6007mm., HFOV(Half Field Of View)= 33.85 deg., Total length=2.1016mm., Fno= 2.4 | | | | | |
| | Curvature Radius | Ape. Stop Distance Lens Thickness Air Gap | Refractive Index | Abbe Surface No. | Focal Length | Material |
|---|---|---|---|---|---|---|
| Object | infinity | infinity | | | | |
| Ape. Stop | infinity | -0.0593 | | | | |
| First Lens | 0.7942 | 0.5426 | 1.546 | 56.114 | 1.4653 | plastic |
| | 83.5977 | 0.1085 | | | | |
| Second Lens | -1.0077 | 0.4500 | 1.546 | 56.114 | 1.2633 | plastic |
| | -0.4740 | 0.0300 | | | | |
| Third Lens | -11.6852 | 0.3000 | 1.589 | 30.038 | -1.0455 | plastic |
| | 0.6564 | 0.2343 | | | | |
| Filter | infinity | 0.1750 | | | | |
| | infinity | 0.2612 | | | | |
| Image Plane | infinity | 0.0000 | | | | |

FIG. 18

| No. | First object-side surface 11 | First image-side surface 12 | Second object-side surface 21 | Second image-side surface 22 | Third object-side surface 31 | Third image-side surface 32 |
|---|---|---|---|---|---|---|
| K | -0.1870389 | 29.6670219 | 2.280205 | -0.6337831 | -1.309805E-07 | -6.6411678 |
| a4 | -0.0471865 | -0.2977809 | 0.17981234 | 1.80337947 | -2.4343612 | -1.7633882 |
| a6 | 0.71621452 | -2.7608289 | -7.4923969 | -5.5693384 | 10.8166036 | 7.09068764 |
| a8 | -23.415411 | 9.08730974 | 74.5857839 | 22.9606179 | -87.035387 | -24.756732 |
| a10 | 319.6663 | 99.2721095 | 42.5658772 | 58.6941044 | 562.901003 | 59.5987345 |
| a12 | -2198.7332 | -853.94249 | -1298.7325 | -157.88168 | -2026.3103 | -90.73919 |
| a14 | 5712.2899 | 0 | 0 | 0 | 3712.67705 | 76.9026415 |
| a16 | 0 | 0 | 0 | 0 | -2668.2608 | -27.797804 |

FIG. 19

| Second Example | | | | | |
|---|---|---|---|---|---|
| EFL(Effective Focal Length)= 1.6683mm., HFOV(Half Field Of View)= 32.49 deg., Total length=2.1058mm., Fno= 2.4 | | | | | |
| | Curvature Radius | Ape. Stop Distance Lens Thickness Air Gap | Refractive Index | Abbe Surface No. | Focal Length | Material |
| Object | infinity | infinity | | | | |
| Ape. Stop | infinity | -0.0909 | | | | |
| First Lens | 0.6870 | 0.3034 | 1.546 | 56.114 | 1.6904 | plastic |
| | 2.2690 | 0.3033 | | | | |
| Second Lens | -0.9291 | 0.4248 | 1.546 | 56.114 | 1.2356 | plastic |
| | -0.4539 | 0.0347 | | | | |
| Third Lens | -11.1154 | 0.3338 | 1.589 | 30.038 | -1.1811 | plastic |
| | 0.7506 | 0.2343 | | | | |
| Filter | infinity | 0.1750 | | | | |
| | infinity | 0.2964 | | | | |
| Image Plane | infinity | 0.0000 | | | | |

FIG. 20

| No. | First object-side surface 11 | First image-side surface 12 | Second object-side surface 21 | Second image-side surface 22 | Third object-side surface 31 | Third image-side surface 32 |
|---|---|---|---|---|---|---|
| K | 0.05935402 | 29.6699212 | 2.41186937 | -0.6005444 | -1.364632E-09 | -6.6700837 |
| a4 | -0.0120498 | -0.0470362 | -0.0519915 | 1.92298176 | -0.8889415 | -1.4921004 |
| a6 | 3.33878477 | -1.6711321 | -5.3491373 | -7.2159949 | -1.6576193 | 5.48293675 |
| a8 | -66.945967 | 11.1401762 | 42.4872902 | 24.2923154 | 25.6010481 | -16.522018 |
| a10 | 827.643228 | -7.9739238 | 157.685733 | 50.646973 | -80.02313 | 34.4835575 |
| a12 | -5037.4317 | -535.8929 | -1079.4747 | -141.47698 | 116.389417 | -45.415858 |
| a14 | 12158.9176 | 0 | 0 | 0 | -70.516841 | 33.4148725 |
| a16 | 0 | 0 | 0 | 0 | 4.17907139 | -10.408244 |

FIG. 21

| Third Example | | | | | | |
|---|---|---|---|---|---|---|
| EFL(Effective Focal Length)= 1.5500mm., HFOV(Half Field Of View)= 34.38 deg., Total length=2.0498mm., Fno= 2.4 | | | | | | |
| | Curvature Radius | Ape. Stop Distance Lens Thickness Air Gap | Refractive Index | Abbe Surface No. | Focal Length | Material |
| Object | infinity | infinity | | | | |
| Ape. Stop | infinity | -0.0592 | | | | |
| First Lens | 0.8077 | 0.5805 | 1.546 | 56.114 | 1.7413 | plastic |
| | 4.0077 | 0.1636 | | | | |
| Second Lens | -0.9141 | 0.3019 | 1.546 | 56.114 | 1.1580 | plastic |
| | -0.4173 | 0.0300 | | | | |
| Third Lens | 20.5571 | 0.3003 | 1.589 | 30.038 | -1.1342 | plastic |
| | 0.6437 | 0.2343 | | | | |
| Filter | infinity | 0.1750 | | | | |
| | infinity | 0.2643 | | | | |
| Image Plane | infinity | 0.0000 | | | | |

FIG. 22

| No. | First object-side surface 11 | First image-side surface 12 | Second object-side surface 21 | Second image-side surface 22 | Third object-side surface 31 | Third image-side surface 32 |
|---|---|---|---|---|---|---|
| K | -0.1938573 | 29.6670237 | 2.30693825 | -0.673897 | -1.262603E-09 | -6.6403215 |
| a4 | -0.2805175 | -0.1062858 | 0.11184682 | 2.43380485 | -1.1833407 | -1.6034655 |
| a6 | 12.8786122 | -0.307245 | -6.5132382 | -16.202508 | -7.2691781 | 5.5000423 |
| a8 | -329.44978 | -24.783307 | 32.9513539 | 75.1206185 | 85.3777883 | -15.378271 |
| a10 | 4308.35804 | 155.624773 | 360.450927 | -1.8114896 | -354.58342 | 30.4031618 |
| a12 | -28104.731 | -798.3586 | -1940.1477 | -180.27984 | 750.003403 | -40.085506 |
| a14 | 71896.9929 | 0 | 0 | 0 | -795.85987 | 30.556026 |
| a16 | 0 | 0 | 0 | 0 | 335.988182 | -10.16888 |

FIG. 23

| Fourth Example | | | | | |
|---|---|---|---|---|---|
| EFL(Effective Focal Length)= 1.5549mm., HFOV(Half Field Of View)= 34.50 deg., Total length=2.1009mm., Fno= 2.4 | | | | | |
| | Curvature Radius | Ape. Stop Distance Lens Thickness Air Gap | Refractive Index | Abbe Surface No. | Focal Length | Material |
| Object | infinity | infinity | | | | |
| Ape. Stop | infinity | -0.0562 | | | | |
| First Lens | 0.8423 | 0.5509 | 1.546 | 56.114 | 1.3857 | plastic |
| | -5.7101 | 0.1077 | | | | |
| Second Lens | -0.8211 | 0.4500 | 1.546 | 56.114 | 1.4650 | plastic |
| | -0.4836 | 0.0300 | | | | |
| Third Lens | 2.7582 | 0.2800 | 1.589 | 30.038 | -1.1814 | plastic |
| | 0.5746 | 0.2343 | | | | |
| Filter | infinity | 0.1750 | | | | |
| | infinity | 0.2730 | | | | |
| Image Plane | infinity | 0.0000 | | | | |

FIG. 24

| No. | First object-side surface 11 | First image-side surface 12 | Second object-side surface 21 | Second image-side surface 22 | Third object-side surface 31 | Third image-side surface 32 |
|---|---|---|---|---|---|---|
| K | -0.2474608 | 0 | 1.54653689 | -0.5599587 | 4.865380E-08 | -5.6310202 |
| a4 | -0.1415109 | -0.0324092 | 0.9293596 | 2.31820947 | -1.9999773 | -1.6539048 |
| a6 | 4.41423985 | -11.640395 | -10.700801 | -13.018968 | -1.2963698 | 5.35192673 |
| a8 | -105.23068 | 164.688248 | 77.0569245 | 72.9031936 | 19.4174177 | -15.959218 |
| a10 | 1200.01267 | -1777.7451 | -144.81973 | -166.32769 | -43.987863 | 34.382866 |
| a12 | -6706.1538 | 10974.5368 | -110.59672 | 199.293239 | -36.377209 | -49.326169 |
| a14 | 14067.4697 | -36617.972 | 0 | 0 | 234.320367 | 40.5999066 |
| a16 | 0 | 48214.267 | 0 | 0 | -289.40972 | -14.568007 |

FIG. 25

| | Curvature Radius | Ape. Stop Distance Lens Thickness Air Gap | Refractive Index | Abbe Surface No. | Focal Length | Material |
|---|---|---|---|---|---|---|
| | | Fifth Example | | | | |
| | EFL(Effective Focal Length)= 1.6068mm., HFOV(Half Field Of View)= 33.44 deg., Total length=2.1033mm., Fno= 2.4 | | | | | |
| Object | infinity | infinity | | | | |
| Ape. Stop | infinity | -0.0585 | | | | |
| First Lens | 0.8159 | 0.6181 | 1.546 | 56.114 | 1.6793 | plastic |
| | 5.4302 | 0.1571 | | | | |
| Second Lens | -0.8687 | 0.3000 | 1.546 | 56.114 | 1.2239 | plastic |
| | -0.4237 | 0.0300 | | | | |
| Third Lens | -150.0000 | 0.3297 | 1.589 | 30.038 | -1.0956 | plastic |
| | 0.7127 | 0.2343 | | | | |
| Filter | infinity | 0.1750 | | | | |
| | infinity | 0.2591 | | | | |
| Image Plane | infinity | 0.0000 | | | | |

FIG. 26

| No. | First object-side surface 11 | First image-side surface 12 | Second object-side surface 21 | Second image-side surface 22 | Third object-side surface 31 | Third image-side surface 32 |
|---|---|---|---|---|---|---|
| K | -0.1957715 | 31.7053339 | 2.14759441 | -0.6430189 | 2.268443E-11 | -7.669949 |
| a4 | -0.1721087 | -0.0271865 | 0.55295305 | 2.7325332 | -0.9129514 | -1.4489976 |
| a6 | 6.3978955 | -1.0860404 | -3.9134033 | -14.977487 | -5.8056587 | 5.01487541 |
| a8 | -146.53981 | -22.207778 | -17.587155 | 57.04105 | 43.0432517 | -15.491765 |
| a10 | 1692.22774 | 150.742439 | 491.575706 | 3.42407574 | -117.81958 | 33.5253018 |
| a12 | -9724.1401 | -766.06611 | -1790.9795 | -89.702463 | 126.193064 | -46.662877 |
| a14 | 21730.3367 | 0 | 0 | 0 | -17.857499 | 36.4802473 |
| a16 | 0 | 0 | 0 | 0 | -42.923029 | -12.267384 |

FIG. 27

|  | Example 1 | Example 2 | Example 3 | Example 4 | Example 5 |
|---|---|---|---|---|---|
| AAG/T1 | 0.2553 | 1.1140 | 0.3335 | 0.2500 | 0.3027 |
| AG12/T1 | 0.2000 | 0.9997 | 0.2818 | 0.1955 | 0.2542 |
| T2/T1 | 0.8293 | 1.4001 | 0.5201 | 0.8168 | 0.4854 |
| T2/AAG | 3.2491 | 1.2568 | 1.5594 | 3.2680 | 1.6034 |
| EFL/T1 | 2.9501 | 5.4987 | 2.6701 | 2.8225 | 2.5996 |
| ALT/T1 | 2.3822 | 3.5007 | 2.0374 | 2.3251 | 2.0188 |
| EFL/AG12 | 14.7530 | 5.5005 | 9.4743 | 14.4373 | 10.2279 |
| T2/AG12 | 4.1475 | 1.4006 | 1.8454 | 4.1783 | 1.9096 |
| AAG/T3 | 0.4617 | 1.0126 | 0.6447 | 0.4918 | 0.5675 |
| EFL/AAG | 11.5574 | 4.9358 | 8.0062 | 11.2919 | 8.5879 |
| ALT/AG12 | 11.9134 | 3.5018 | 7.2292 | 11.8932 | 7.9427 |
| ALT/AAG | 3.1423 | 6.1090 | 9.3021 | 3.1306 | 6.6692 |
| AG12/T3 | 0.3617 | 0.9086 | 0.5448 | 0.3846 | 0.4765 |
| \|f1/f\|+\|f2/f\| | 1.7046 | 1.7539 | 1.8705 | 1.8334 | 1.8068 |
| \|f1/f\|+\|f3/f\| | 1.5686 | 1.7212 | 1.8552 | 1.6510 | 1.7270 |

FIG. 28

OPTICAL IMAGING LENS AND ELECTRONIC DEVICE COMPRISING THE SAME

CROSS REFERENCE TO RELATED APPLICATION

This application claims priority from Taiwan Patent Application No. 103137265, filed on Oct. 28, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of three lens elements and an electronic device which includes such optical imaging lens set.

2. Description of the Prior Art

In recent years, the popularity of mobile phones and digital cameras makes the sizes of various portable electronic products reduce quickly, and so does the size of the photography modules. The current trend of research is to develop an optical imaging lens set of a shorter length with uncompromised good quality. The most important characteristics of an optical imaging lens set are image quality and size.

Both U.S. Pat. No. 7,436,605 and U.S. Pat. No. 7,813,056 disclose optical imaging lens sets of three lens elements. However, in both patents mentioned above, the first lens element has negative refractive power, the second lens element has positive refractive power. This arrangement cannot achieve good optical performance. Besides, the size of the optical imaging lens set is too big (about 7~8 mm) to satisfy the specification requirements of consumer electronics products.

Therefore, how to reduce the total length of a photographic device, but still maintain good optical performance, is an important research objective.

SUMMARY OF THE INVENTION

In light of the above, the present invention proposes an optical imaging lens set that is lightweight, has a low production cost, has an enlarged half of field of view, has a high resolution and has high image quality. The optical imaging lens set of three lens elements of the present invention has an aperture stop, a first lens element, a second lens element and a third lens element sequentially from an object side to an image side along an optical axis.

An optical imaging lens includes: a first, second and third lens element, the first lens element has a positive refracting power, and has an object-side surface with a convex part in a vicinity of the optical axis, and a convex part in a vicinity of its periphery, the second lens element has a positive refracting power, and has an object-side surface with a concave part in a vicinity of the optical axis, and a concave part in a vicinity of its periphery, and has an image-side surface with a convex part in a vicinity of the optical axis, the third lens element has negative refracting power, and has an image-side surface with a concave part in a vicinity of the optical axis, and a convex part in a vicinity of its periphery. Besides, the Abbe number of the first lens element is V1; the Abbe number of the second lens element is V2; the Abbe number of the third lens element is V3, and in the optical imaging lens set of three lens elements of the present invention, the relationship of $|V1-V2| \leq 10.0$ and $20.0 \leq |V1-V3|$ are satisfied. In addition, the optical imaging lens set does not include any lens element with refractive power other than said first, second and third lens elements.

In the optical imaging lens set of three lens elements of the present invention, an air gap AG12 along the optical axis is disposed between the first lens element and the second lens element, an air gap AG23 along the optical axis is disposed between the second lens element and the third lens element, and the sum of both of two air gaps between adjacent lens elements from the first lens element to the third lens element along the optical axis is AAG, $AAG=AG12+AG23$.

In the optical imaging lens set of three lens elements of the present invention, the first lens element has a first lens element thickness T1 along the optical axis, the second lens element has a second lens element thickness T2 along the optical axis, the third lens element has a third lens element thickness T3 along the optical axis, and the total thickness of all the lens elements in the optical imaging lens set along the optical axis is ALT, $ALT=T1+T2+T3$.

Besides, the distance between an object-side surface of the first lens element to an image plane is TTL, the effective focal length of the optical imaging lens set is EFL, the distance between the image-side surface of the third lens element to an image plane along the optical axis is BFL (back focal length).

In addition, further defining: The focal length of the first lens element is f1; The focal length of the second lens element is f2; The focal length of the third lens element is f3.

In the optical imaging lens set of three lens elements of the present invention, the relationship $AAG/T1 \leq 1.2$ is satisfied.

In the optical imaging lens set of three lens elements of the present invention, the relationship $1.4 \leq T2/AG12$ is satisfied.

In the optical imaging lens set of three lens elements of the present invention, the relationship $AG12/T1 \leq 1.0$ is satisfied.

In the optical imaging lens set of three lens elements of the present invention, the relationship $AAG/T3 \leq 1.1$ is satisfied.

In the optical imaging lens set of three lens elements of the present invention, the relationship $T2/T1 \leq 1.45$ is satisfied.

In the optical imaging lens set of three lens elements of the present invention, the relationship $4.6 \leq EFL/AAG$ is satisfied.

In the optical imaging lens set of three lens elements of the present invention, the relationship $1.25 \leq T2/AAG$ is satisfied.

In the optical imaging lens set of three lens elements of the present invention, the relationship $3.5 \leq ALT/AG12$ is satisfied.

In the optical imaging lens set of three lens elements of the present invention, the relationship $EFL/T1 \leq 5.5$ is satisfied.

In the optical imaging lens set of three lens elements of the present invention, the relationship $3.0 \leq ALT/AAG$ is satisfied.

In the optical imaging lens set of three lens elements of the present invention, the relationship $ALT/T1 \leq 3.6$ is satisfied.

In the optical imaging lens set of three lens elements of the present invention, the relationship AG12/T3≤1.0 is satisfied.

In the optical imaging lens set of three lens elements of the present invention, the relationship 5.5≤EFL/AG12 is satisfied.

In the optical imaging lens set of three lens elements of the present invention, the relationship |f1/EFL|+|f2/EFL|≤2.0 is satisfied.

In the optical imaging lens set of three lens elements of the present invention, the relationship |f1/EFL|+|f3/EFL|≤2.0 is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows some important ratios in the examples.

DETAILED DESCRIPTION

Figure 6:
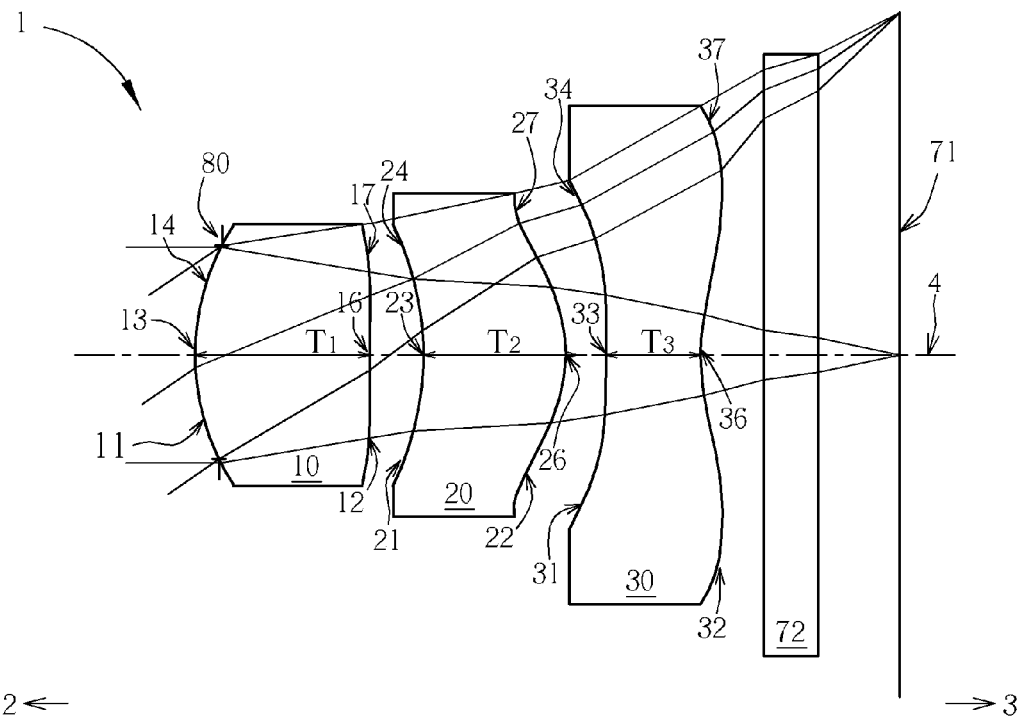
FIG. 6 illustrates a first example of the optical imaging lens set of the present invention.

Before the detailed description of the present invention, the first thing to be noticed is that in the present invention, similar (not necessarily identical) elements are labeled as the same numeral references. In the present specification, the description "a lens element having positive refracting power (or negative refractive power)" means that the paraxial refractive power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a part in a vicinity of the optical axis", and the region C of the lens element is defined as "apart in a vicinity of a periphery of the lens element".

Besides, the lens element may also have an extending part E extended radially and outwardly from the region C, namely the part outside of the clear aperture of the lens element. The extending part E is usually used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and conversion point. The central point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the Nth conversion point (farthest one to the optical axis within the scope of the clear aperture of the surface). The portion of a surface of the lens element between the central point and the first conversion point is defined as the portion in a vicinity of the optical axis. The portion located radially outside of the Nth conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point (s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element.

The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of three lens elements of the present invention, sequentially located from an object side 2 (where an object is located) to an image side 3 along an optical axis 4, have an aperture stop 80, a first lens element 10, a second lens element 20, a third lens element 30, a filter 72 and an image plane 71. Generally speaking, the first lens element 10, the second lens element 20 and the third lens element 30 may be made of a transparent plastic material and each has an appropriate refractive power, but the present invention is not limited to this. There are exclusively three lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed on the object side 2 of the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30 and the filter 72.

In the embodiments of the present invention, the optional filter 72 may be a filter of various suitable functions, for example, the filter 72 may be an infrared cut filter (IR cut filter), placed between the third lens element 30 and the image plane 71. The filter 72 is made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness T1, the second lens element 20 has a second lens element thickness T2, and the third lens element 30 has a third lens element thickness T3. Therefore, the total thickness of all the lens elements in the optical imaging lens set 1 along the optical axis 4 is ALT, ALT=T1+T2+T3.

In addition, between two adjacent lens elements in the optical imaging lens set 1 of the present invention there is an air gap along the optical axis 4. For example, an air gap AG12 is disposed between the first lens element 10 and the second lens element 20, an air gap AG23 is disposed between the second lens element 20 and the third lens element 30. Therefore, the sum of both of two air gaps between adjacent lens elements from the first lens element 10 to the third lens element 30 along the optical axis 4 is AAG, AAG=AG12+AG23.

In addition, the distance between the first object-side surface 11 of the first lens element 10 to the image plane 71, namely the total length of the optical imaging lens set along the optical axis 4 is TTL; the effective focal length of the optical imaging lens set is EFL, the distance between the image-side surface 32 of the third lens element 30 to the image plane 71 along the optical axis 4 is BFL.

Besides, further defining: The focal length of the first lens element 10 is f1; The focal length of the second lens element 20 is f2; The focal length of the third lens element 30 is f3.

First Example

Figures 7A, 7B, 7C, 7D:
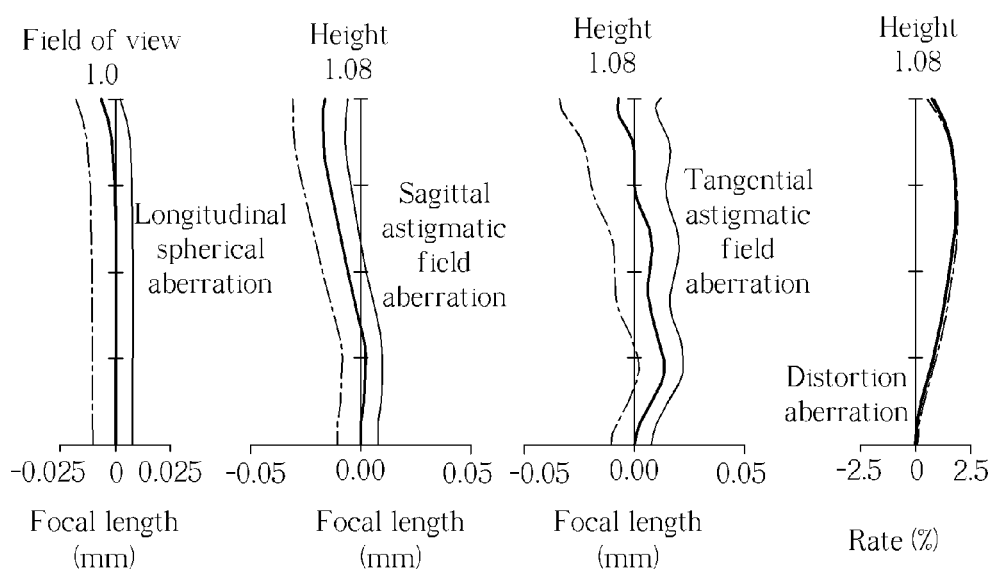
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stand for "image height". The image height is 1.08 mm.

The optical imaging lens set 1 of the first example has three lens elements 10 to 30 made of a plastic material and having refractive power. The optical imaging lens set 1 also has an aperture stop 80, a filter 72, and an image plane 71. The aperture stop 80 is provided between the object-side 2 and the first lens element 10. The filter 72 may be used for preventing specific wavelength light (such as the infrared light) from reaching the image plane and adversely affecting the imaging quality.

The first lens element 10 has positive refractive power. The first object-side surface 11 facing toward the object side 2 is a convex surface, having a convex part 13 in the vicinity of the optical axis and a convex part 14 in a vicinity of its circular periphery. The first image-side surface 12 facing toward the image side 3 has a concave part 16 in the vicinity of the optical axis and a convex part 17 in a vicinity of its circular periphery.

The second lens element 20 has positive refractive power. The second object-side surface 21 facing toward the object side 2 has a concave part 23 in the vicinity of the optical axis and a concave part 24 in a vicinity of its circular periphery. The second image-side surface 22 facing toward the image side 3 has a convex part 26 in the vicinity of the optical axis and a concave part 27 in a vicinity of its circular periphery.

The third lens element 30 has negative refractive power. The third object-side surface 31 facing toward the object side 2 has a concave part 33 in the vicinity of the optical axis and a concave part 34 in a vicinity of its circular periphery. The third image-side surface 32 facing toward the image side 3 has a concave part 36 in the vicinity of the optical axis and a convex part 37 in a vicinity of its circular periphery. The filter 72 may be disposed between the third lens element 30 and the image plane 71.

In the optical imaging lens element 1 of the present invention, the object-side surfaces 11/21/31 and image-side surfaces 12/22/32 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and a2i is the aspheric coefficient of the 2i order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 2.1016 mm. The image height is 1.08 mm, and HFOV is 33.85 degrees. Some important ratios of the first example are as follows:

AAG/T1=0.2553
AG12/T1=0.2000
T2/T1=0.8293
T2/AAG=3.2491
EFL/T1=2.9501
ALT/T1=2.3822
EFL/AG12=14.7530
T2/AG12=4.1475
AAG/T3=0.4617
EFL/AAG=11.5574
ALT/AG12=11.9134
ALT/AAG=3.1423
AG12/T3=0.3617
|f1/EFL|+|f2/EFL|=1.7046
|f1/EFL|+|f3/EFL|=1.5686

Second Example

Figure 8:
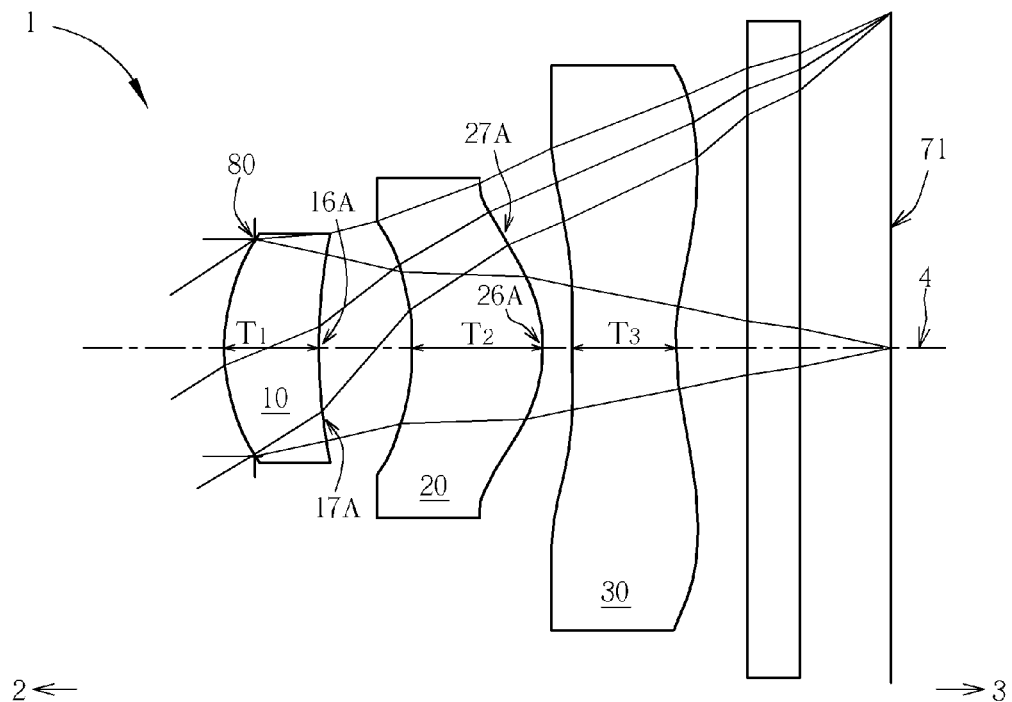
FIG. 8 illustrates a second example of the optical imaging lens set of three lens elements of the present invention.
Figures 9A, 9B, 9C, 9D:
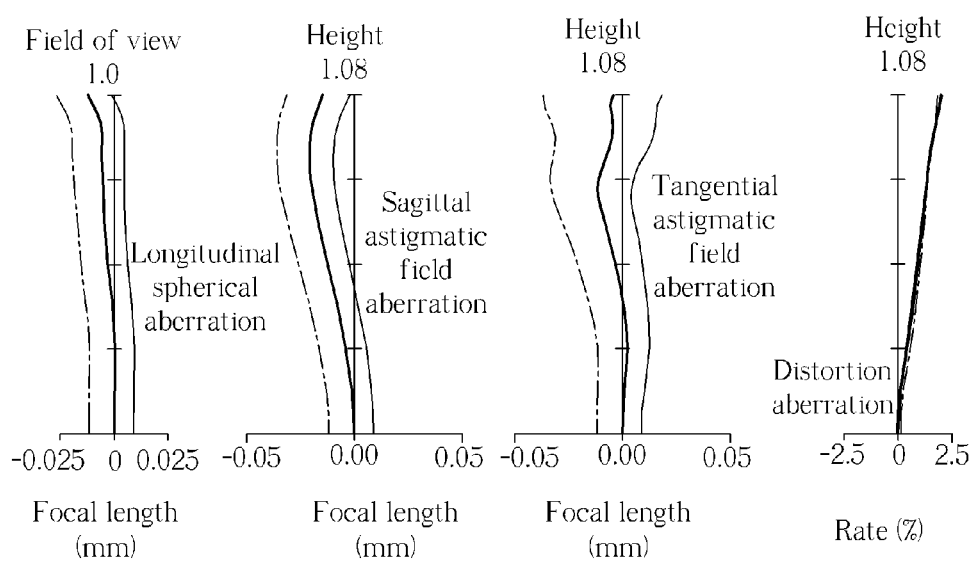
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has and the basic lens elements will be labeled in figures. Other components that are the same as what the first example has, such as the object-side surface, the image-side surface, the part in a vicinity of the optical axis and the part in a vicinity of its circular periphery will be omitted in the following example. Please refer to FIG. 9A for the longitudinal spherical aberration on the image plane 71 of the second example; please refer to FIG. 9B for the astigmatic aberration on the sagittal direction; please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the first image-side surface 12 of the first lens element 10 has a concave part 16A in the vicinity of the optical axis and a concave part 17A in a vicinity of its circular periphery; the second image-side surface 22 of the second lens element 20 has a convex part 26A in the vicinity of the optical axis and a convex part 27A in a vicinity of its circular periphery. The optical data of the second example of the optical imaging lens set are shown in FIG. 20 while the aspheric surface data are shown in FIG. 21. The length of the optical imaging lens set is 2.1058 mm. The image height is 1.08 mm, HFOV is 32.49 degrees. Some important ratios of the second example are as follows:

AAG/T1=1.1140
AG12/T1=0.9997
T2/T1=1.4001
T2/AAG=1.2568
EFL/T1=5.4987
ALT/T1=3.5007
EFL/AG12=5.5005
T2/AG12=1.4006
AAG/T3=1.0126
EFL/AAG=4.9358
ALT/AG12=3.5018
ALT/AAG=6.1090
AG12/T3=0.9086
|f1/EFL|+|f2/EFL|=1.7539
|f1/EFL|+|f3/EFL|=1.7212

Third Example

Figure 10:
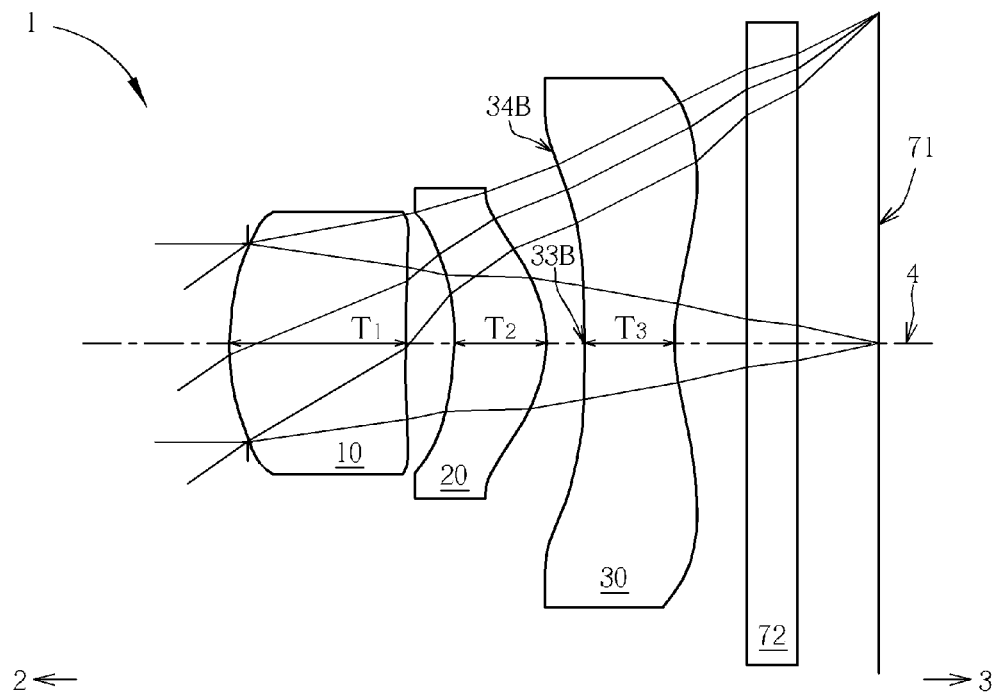
FIG. 10 illustrates a third example of the optical imaging lens set of three lens elements of the present invention.
Figures 11A, 11B, 11C, 11D:
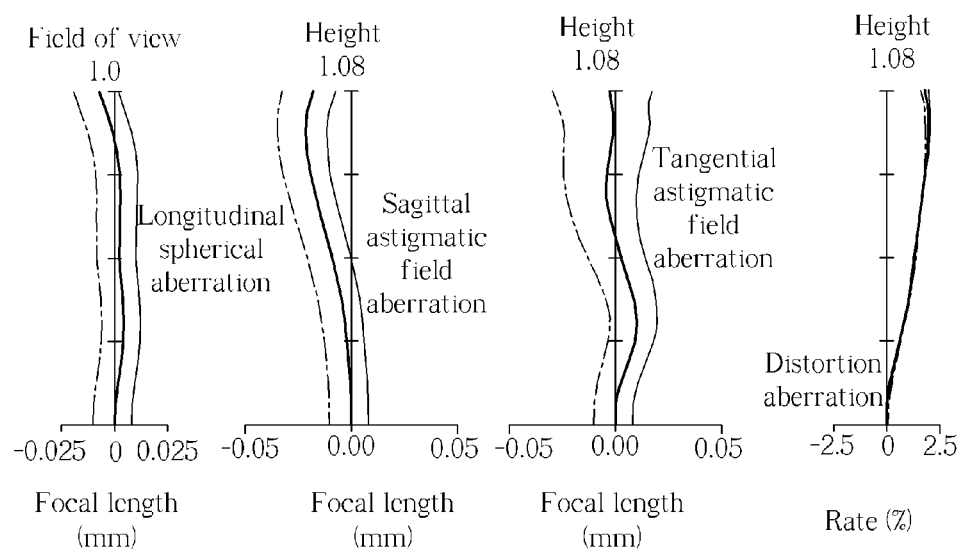
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33B in the vicinity of the optical axis and a concave part 34B in a vicinity of its circular periphery. The optical data of the third example of the optical imaging lens set are shown in FIG. 22 while the aspheric surface data are shown in FIG. 23. The length of the optical imaging lens set is 2.0498 mm. The image height is 1.08 mm, HFOV is 34.38 degrees. Some important ratios of the third example are as follows:

AAG/T1=0.3335
AG12/T1=0.2818
T2/T1=0.5201
T2/AAG=1.5594
EFL/T1=2.6701
ALT/T1=2.0374
EFL/AG12=9.4743
T2/AG12=1.8454
AAG/T3=0.6447
EFL/AAG=8.0062
ALT/AG12=7.2292
ALT/AAG=9.3021

AG12/T3=0.5448
|f1/EFL|+|f2/EFL|=1.8705
|f1/EFL|+|f3/EFL|=1.8552

Fourth Example

Figure 12:
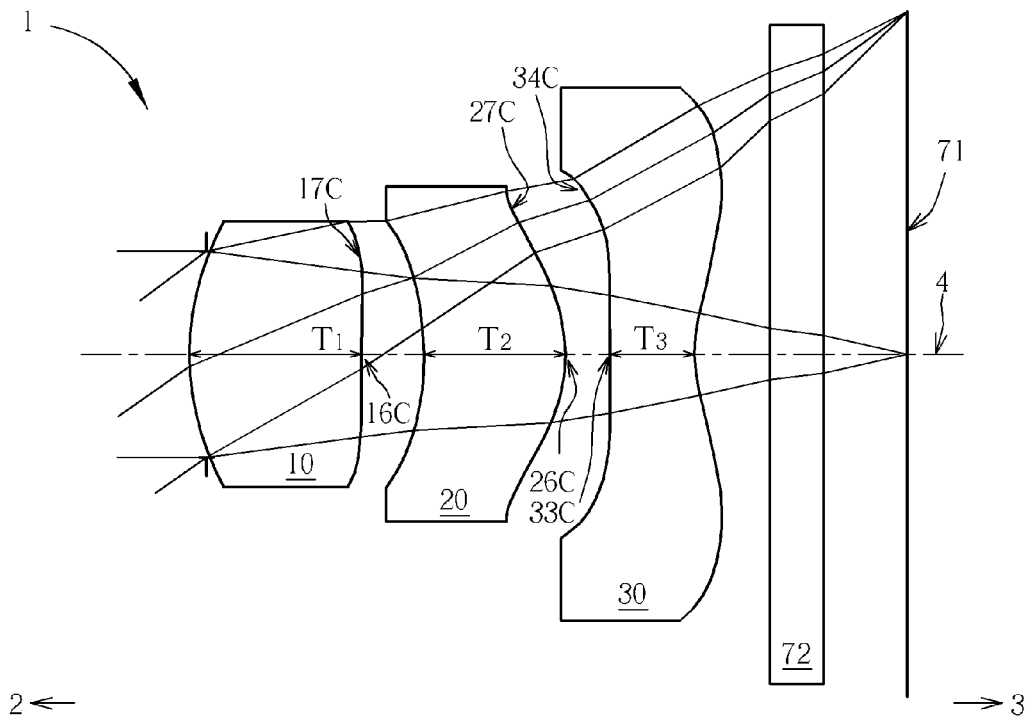
FIG. 12 illustrates a fourth example of the optical imaging lens set of three lens elements of the present invention.
Figures 13A, 13B, 13C, 13D:
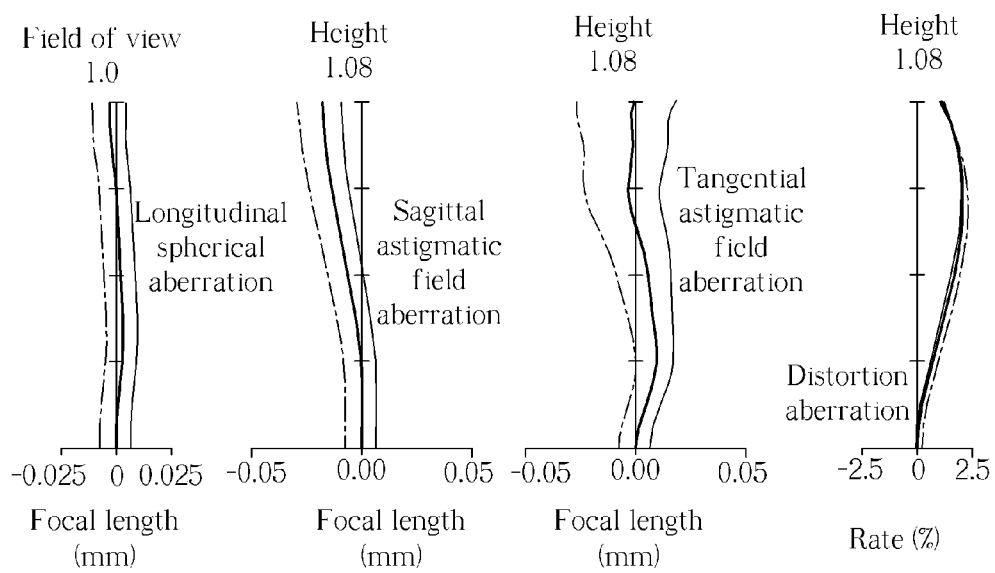
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the first image-side surface 12 of the first lens element 10 has a convex part 16C in the vicinity of the optical axis and a convex part 17C in a vicinity of its circular periphery; the second image-side surface 22 of the second lens element 20 has a convex part 26C in the vicinity of the optical axis and a convex part 27C in a vicinity of its circular periphery; the third object-side surface 31 of the third lens element 30 is a has a convex part 33C in the vicinity of the optical axis and a concave part 34C in a vicinity of its circular periphery. The optical data of the fourth example of the optical imaging lens set are shown in FIG. 24 while the aspheric surface data are shown in FIG. 25. The length of the optical imaging lens set is 2.1009 mm. The image height is 1.08 mm, HFOV is 34.50 degrees. Some important ratios of the fourth example are as follows:
AAG/T1=0.2500
AG12/T1=0.1955
T2/T1=0.8168
T2/AAG=3.2680
EFL/T1=2.8225
ALT/T1=2.3251
EFL/AG12=14.4373
T2/AG12=4.1783
AAG/T3=0.4918
EFL/AAG=11.2919
ALT/AG12=11.8932
ALT/AAG=3.1306
AG12/T3=0.3846
|f1/EFL|+|f2/EFL|=1.8334
|f1/EFL|+|f3/EFL|=1.6510

Fifth Example

Figure 14:
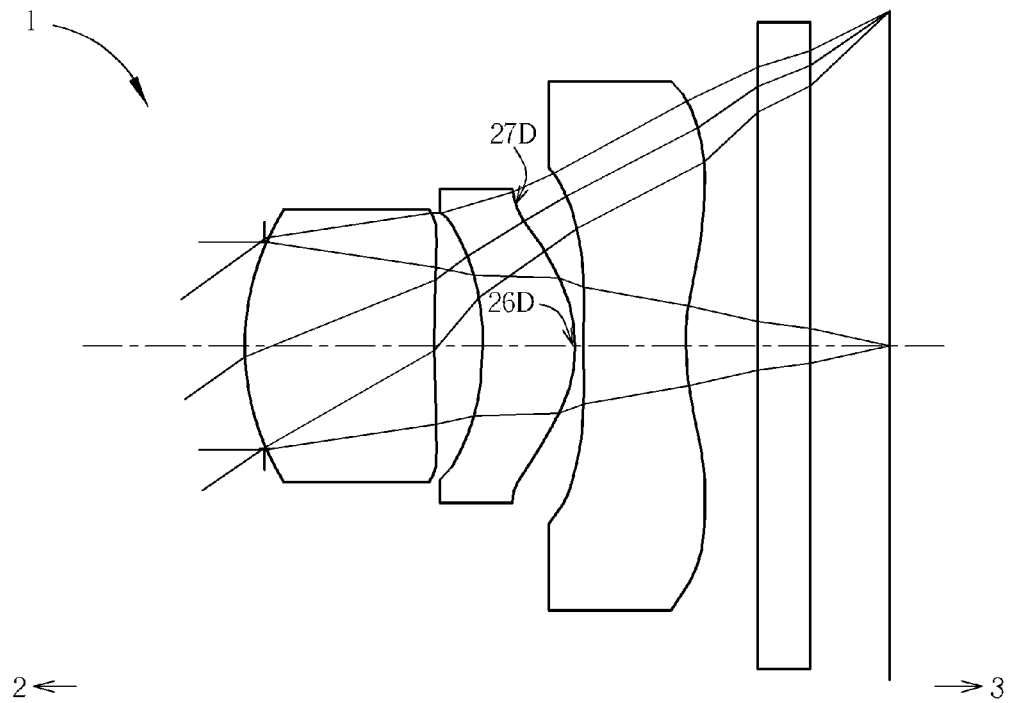
FIG. 14 illustrates a fifth example of the optical imaging lens set of three lens elements of the present invention.
Figures 15A, 15B, 15C, 15D:
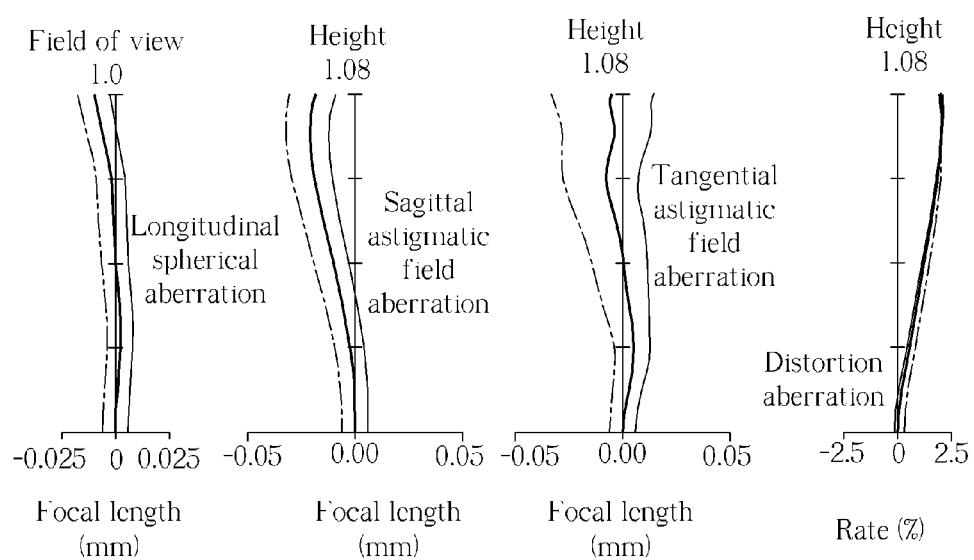
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the second image-side surface 22 of the second lens element 20 has a convex part 26D in the vicinity of the optical axis and a convex part 27D in a vicinity of its circular periphery. The optical data of the fifth example of the optical imaging lens set are shown in FIG. 26 while the aspheric surface data are shown in FIG. 27. The length of the optical imaging lens set is 2.1033 mm. The image height is 1.08 mm, HFOV is 33.44 degrees. Some important ratios of the fifth example are as follows:
AAG/T1=0.3027
AG12/T1=0.2542
T2/T1=0.4854
T2/AAG=1.6034
EFL/T1=2.5996
ALT/T1=2.0188
EFL/AG12=10.2279
T2/AG12=1.9096
AAG/T3=0.5675
EFL/AAG=8.5879
ALT/AG12=7.9427
ALT/AAG=6.6692
AG12/T3=0.4765
|f1/EFL|+|f2/EFL|=1.8068
|f1/EFL|+|f3/EFL|=1.7270

Some important ratios in each example are shown in FIG. 28. In light of the above examples, the inventors observe the following features:

The first lens element and the second lens element have positive refractive power, to provide the needed refractive power for the optical imaging lens set. The third lens element has negative refractive power, to correct aberration. In addition, the aperture stop is disposed between the object side and the first lens element, helping to collect the image light and decreasing the total length of the optical imaging lens set. Besides, the first object-side surface of the first lens element has a convex part in a vicinity of the optical axis and a convex part in a vicinity of its circular periphery and can help to collect the image light; the second object-side surface of the second lens element has a concave part in a vicinity of the optical axis and a concave part in a vicinity of its circular periphery; the second image-side surface of the second lens element has a convex part in a vicinity of the optical axis; the third image-side surface of the third lens element has a concave part in a vicinity of the optical axis and a convex part in a vicinity of its circular periphery, where each of the surfaces match each other, in order to improve the aberration.

In addition, the inventors discover that there are some better ratio ranges for different data according to the above various important ratios. Better ratio ranges help the designers to design the better optical performance and an effectively reduced length of a practically possible optical imaging lens set. For example:

$AAG/T1 \leq 1.2$, $AG12/T1 \leq 1.0$, $T2/AAG \geq 1.25$, $EFL/AG12 \geq 5.5$, $T2/AG12 \geq 1.4$, $AAG/T3 \leq 1.1$, $EFL/AAG \geq 4.6$, $ALT/AG12 \geq 3.5$, $ALT/AAG \geq 3.0$, $AG12/T3 \leq 1.0$: (1)

T1, T2, T3 are the thicknesses of the first lens element, the second lens element and the third lens element along said optical axis respectively. ALT is the total thickness of said first lens element, said second lens element and said third lens element along said optical axis. AG12 is an air gap between said first lens element and said second lens element along the optical axis. AAG is the sum of both of two air gaps between adjacent lens elements from the first lens element to the third lens element along the optical axis. Decreasing any values mentioned above can help in shrinking the total length of the optical imaging lens set. But considering the difficulties of during the manufacturing process, T1, T2, T3 and ALT cannot be shrunk unlimitedly, but AG12 and AAG can be shrunk more compared with T1, T2, T3 and ALT. Since T1, T2, T3 and ALT should be maintained within a relatively large value, and AG12 and AAG can be decreased more, so AAG/T1, AG12/T1, AAG/T3 and AG12/T3 should preferably be small. On the other hand, T2/AAG, EFL/AG12, T2/AG12, EFL/AAG, ALT/AG12 and ALT/AAG should preferably be large. If the relationship AAG/T1≤1.2 is satisfied, ideally, it is suggested that the range may be 0.2~1.2; If the relationship AG12/T1≤1.0 is satisfied, ideally, it is suggested that the range may be 0.1~1.0; If the relationship T2/AAG≥1.25 is satisfied, ideally, it is suggested that the range may be 1.25~4.0; If the relationship EFL/AG12≥5.5 is satisfied, ideally, it is suggested that the range may be 5.5~20.0; If the relationship T2/AG12≥1.4 is satisfied, ideally, it is suggested that the range may be 1.4~5.0; If the relationship AAG/T3≤1.1 is satisfied, ideally, it is suggested that the range may be 0.3~1.1; If the relationship EFL/AAG≥4.6 is satisfied, ideally, it is suggested that the range may be 4.6~12.0; If the relationship ALT/AG12≥3.5 is satisfied, ideally, it is suggested that the range may be 3.5~15.0; If the relationship ALT/AAG≥3.0 is satisfied, ideally, it is suggested that the range may be 3.0~10.0; If the relationship AG12/T3≤1.0 is satisfied, ideally, it is suggested that the range may be 0.3~1.0.

$$T2/T1 \leq 1.45, ALT/T1 \leq 3.6, EFL/T1 \leq 5.5: \quad (2)$$

T1, T2, T3 and ALT should be maintained within a suitable value range. Otherwise, the total length cannot be thinned if every lens elements has too big thickness, or it's difficult to manufacture the optical imaging lens set if every lens elements have too small thickness. If the relationship T2/T1≤1.45 is satisfied, ideally, it is suggested that the range may be 0.4~1.45; If the relationship ALT/T1≤3.6 is satisfied, ideally, it is suggested that the range may be 1.5~3.6; If the relationship EFL/T1≤5.5 is satisfied, ideally, it is suggested that the range may be 2.0~5.5.

$$|f1/EFL|+|f2/EFL| \leq 2.0, |f1/EFL|+|f3/EFL| \leq 2.0: \quad (3)$$

The above relationships should be satisfied, to ensure that the first lens element, the second lens element and the third lens element have enough refractive power. If the relationship |f1/EFL|+|f2/EFL|≤2.0 is satisfied, ideally, it is suggested that the range may be 1.5~2.0; If the relationship |f1/EFL|+|f3/EFL|≤2.0 is satisfied, ideally, it is suggested that the range may be 1.5~2.0.

Figure 16:
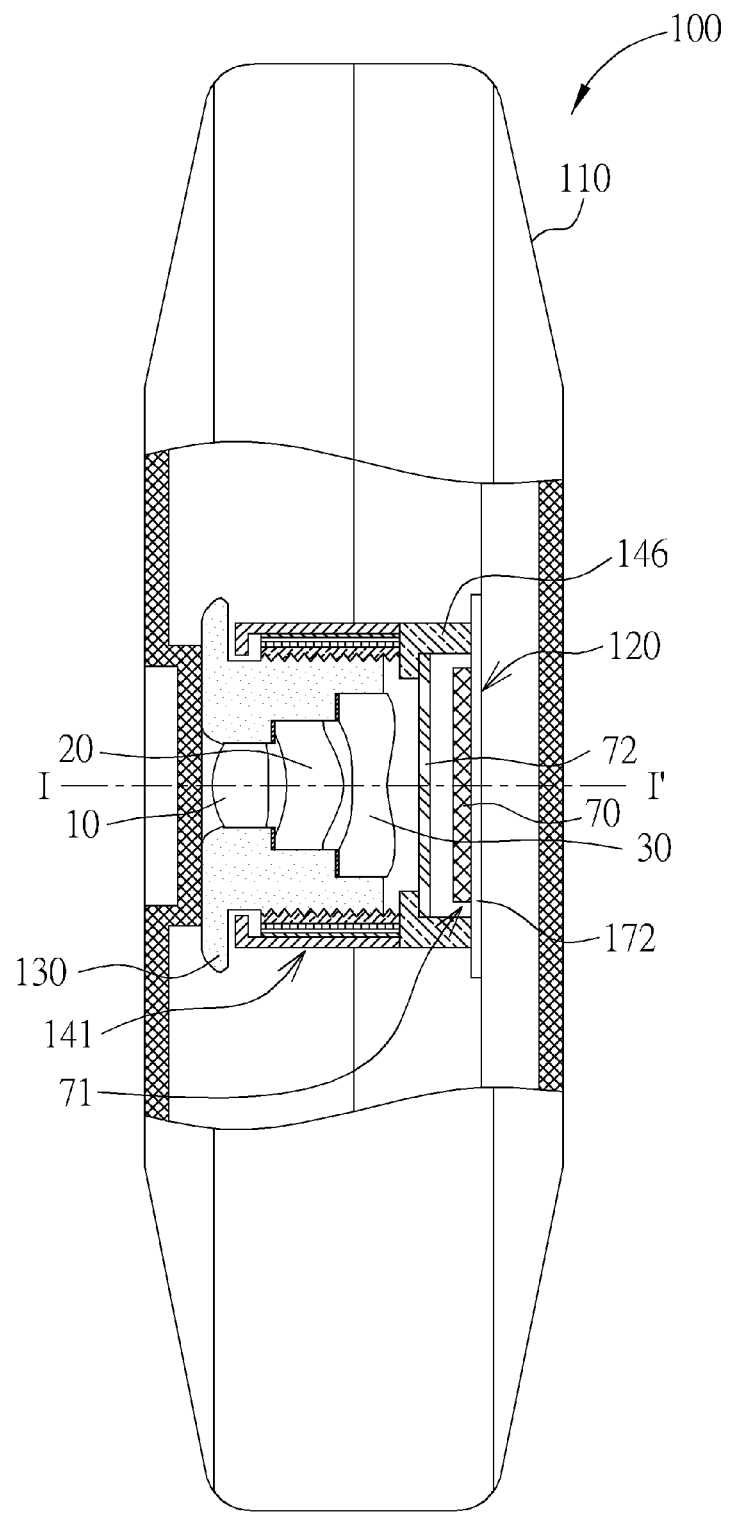
FIG. 16 illustrates a first preferred example of the portable electronic device with an optical imaging lens set of the present invention.

The optical imaging lens set 1 of the present invention may be applied to an electronic device, such as game consoles or driving recorders. Please refer to FIG. 16. FIG. 16 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 16 as an example, but the electronic device 100 is not limited to a driving recorder.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the three lens elements 10, 20 and 30 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 17:
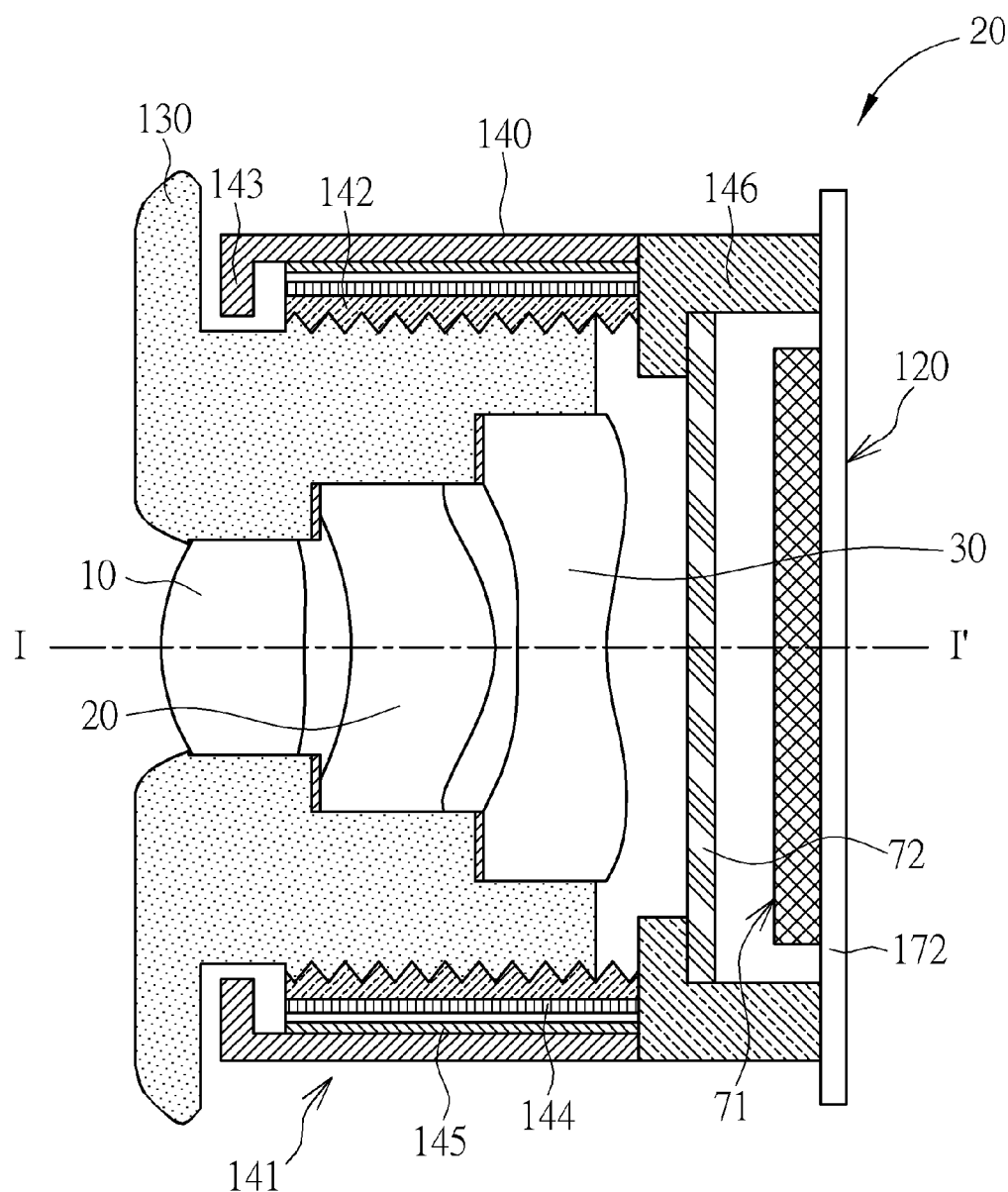
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical imaging lens set, from an object side toward an image side in order along an optical axis comprising: an aperture stop, a first lens element, a second lens element and a third lens element, said first to third lens elements having an object-side surface facing toward the object side as well as an image-side surface facing toward the image side, wherein:

the first lens element has positive refractive power, an object-side surface with a convex part in a vicinity of the optical axis, and a convex part in a vicinity of its periphery;

the second lens element has positive refractive power, an object-side surface with a concave part in a vicinity of the optical axis, and a concave part in a vicinity of its periphery, an image-side surface with a convex part in a vicinity of the optical axis; and the third lens element has negative refractive power, an image-side surface with a concave part in a vicinity of the optical axis, and a convex part in a vicinity of its periphery;

wherein a sum of both of two air gaps AAG between each lens element from said first lens element to said third lens element along the optical axis, a thickness T1 of said first lens element along said optical axis, a thickness T2 of said second lens element along said optical axis, a thickness T3 of said third lens element along said optical axis, an Abbe number V1 of the first lens element, an Abbe number V2 of the second lens element, and an Abbe number V3 of the third lens element satisfy the relationships AAG/T3≤1.1, T2/T1≤1.45, AAG/T1≤1.2, and |V1−V2|≤10.0, in addition, the optical imaging lens set does not include any lens element with refractive power other than said first, second and third lens elements.

2. The optical imaging lens set of claim 1, wherein an air gap AG12 between said first lens elements and said second lens element along said optical axis a relationship 1.4≤T2/AG12≤5.0.

3. The optical imaging lens set of claim 1, wherein an air gap AG12 between said first lens elements and said second lens element along said optical axis satisfies a relationship AG12/T1≤1.0.

4. The optical imaging lens set of claim 1, wherein an effective focal length EFL of the optical imaging lens set satisfies a relationship 4.6≤EFL/AAG≤12.0.

5. The optical imaging lens set of claim 1, further satisfying a relationship 1.25≤T2/AAG≤4.0.

6. The optical imaging lens set of claim 5, wherein a total thickness ALT of said first lens element, said second lens element and said third lens element along said optical axis, and an air gap AG12 between said first lens elements and said second lens element along said optical axis satisfy a relationship 3.5≤ALT/AG12≤15.0.

7. The optical imaging lens set of claim 1, wherein an effective focal length EFL of the optical imaging lens set satisfies a relationship EFL/T1≤5.5.

8. The optical imaging lens set of claim 7, wherein a total thickness ALT of said first lens element, said second lens element and said third lens element along said optical axis satisfies a relationship 3.0≤ALT/AAG≤10.0.

9. The optical imaging lens set of claim 1, wherein a total thickness ALT of said first lens element, said second lens element and said third lens element along said optical axis satisfies a relationship ALT/T1≤3.6.

10. The optical imaging lens set of claim 9, wherein an air gap AG12 between said first lens elements and said second lens element along said optical axis satisfies a relationship AG12/T3≤1.0.

11. The optical imaging lens set of claim 1, wherein an effective focal length EFL of the optical imaging lens set, and an air gap AG12 between said first lens elements and said second lens element along said optical axis satisfy a relationship 5.5≤EFL/AG12≤20.0.

12. The optical imaging lens set of claim 11, wherein a focal length f1 of the first lens element, and the focal length f2 of the second lens element satisfy a relationship |f1/EFL|+|f2/EFL|≤2.0.

13. The optical imaging lens set of claim 1, wherein a focal length f1 of the first lens element, the focal length f3 of the third lens element, and an effective focal length EFL of the optical imaging lens set satisfy a relationship |f1/EFL|+|f3/EFL|≤2.0.

14. An electronic device, comprising:
a case; and
an image module disposed in said case and comprising:
an optical imaging lens set of claim 1;
a barrel for an installation of said optical imaging lens set;
a module housing unit for an installation of said barrel;
a substrate for an installation of said module housing unit; and
an image sensor disposed on the substrate and disposed at an image side of said optical imaging lens set.

* * * * *